United States Patent
Imafuku et al.

(10) Patent No.: US 12,179,852 B2
(45) Date of Patent: Dec. 31, 2024

(54) MOVING BODY

(71) Applicant: HONDA MOTOR CO., LTD., Tokyo (JP)

(72) Inventors: Hideki Imafuku, Tokyo (JP); Yoshinori Izumi, Saitama (JP); Ryota Mose, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 380 days.

(21) Appl. No.: 17/529,568

(22) Filed: Nov. 18, 2021

(65) Prior Publication Data

US 2022/0204071 A1 Jun. 30, 2022

(30) Foreign Application Priority Data

Dec. 25, 2020 (JP) .................................. 2020-217649

(51) Int. Cl.
*B62D 5/04* (2006.01)
(52) U.S. Cl.
CPC ........... *B62D 5/046* (2013.01); *B62D 5/0409* (2013.01); *B62D 5/0481* (2013.01)
(58) Field of Classification Search
CPC ..... B62D 5/046; B62D 5/0409; B62D 5/0481
USPC ........................................................ 701/42
See application file for complete search history.

(56) References Cited

U.S. PATENT DOCUMENTS

| 6,041,884 A * | 3/2000 | Shimizu | B62D 5/0481 180/443 |
| 6,442,462 B1 * | 8/2002 | Nishizaki | B62D 5/006 701/41 |
| 6,580,989 B1 * | 6/2003 | Husain | B62D 5/006 180/405 |
| 6,842,678 B2 * | 1/2005 | Husain | B62D 5/003 701/41 |

(Continued)

FOREIGN PATENT DOCUMENTS

| CN | 101446344 A | 6/2009 |
| CN | 108638983 A | 10/2018 |

(Continued)

OTHER PUBLICATIONS

Jul. 29, 2023, Translation of Chinese Office Action issued for related CN Application No. 202111575354.5.

(Continued)

*Primary Examiner* — Kurt Philip Liethen
*Assistant Examiner* — John D Bailey
(74) *Attorney, Agent, or Firm* — Paratus Law Group, PLLC

(57) ABSTRACT

A moving body having a steering device and a steering control device which controls the steering device to control steering of the moving body. The steering control device selectively performs a first steering control which controls the steering of the moving body based on a movement status of the moving body and a second steering control which limits the steering of the moving body. The steering control device performs the second steering control based on a (Continued)

steering state of the moving body by the first steering control before occurrence of a failure when the failure related to execution of the first steering control occurs in a state where the first steering control is performed.

8 Claims, 8 Drawing Sheets

(56) References Cited

U.S. PATENT DOCUMENTS

| | | | | |
|---|---|---|---|---|
| 7,604,083 B2* | 10/2009 | Chino | B62D 5/006 | 180/405 |
| 7,628,245 B2* | 12/2009 | Osonoi | B62D 5/0481 | 180/405 |
| 7,690,475 B2* | 4/2010 | Tsutsumi | B62D 5/0478 | 180/405 |
| 8,087,488 B2* | 1/2012 | Onuma | B62D 5/003 | 180/404 |
| 9,637,167 B2* | 5/2017 | Miyasaka | B62D 6/10 | |
| 10,759,471 B2* | 9/2020 | Ueyama | B62D 5/0463 | |
| 2004/0039508 A1* | 2/2004 | Husain | B62D 5/0481 | 180/443 |
| 2005/0045413 A1* | 3/2005 | Shitamitsu | B62D 5/0409 | 180/402 |
| 2009/0112418 A1 | 4/2009 | Buur et al. | | |
| 2009/0210113 A1* | 8/2009 | Auguet | B62D 5/003 | 701/42 |
| 2009/0240389 A1* | 9/2009 | Nomura | H02P 6/16 | 701/41 |
| 2012/0226417 A1* | 9/2012 | Nishikawa | B62D 6/003 | 701/41 |
| 2012/0296525 A1* | 11/2012 | Endo | B62D 5/0466 | 701/42 |
| 2014/0035374 A1* | 2/2014 | Oka | H02J 7/35 | 307/52 |
| 2014/0222295 A1* | 8/2014 | Dornhege | B62D 6/002 | 701/42 |
| 2016/0075370 A1* | 3/2016 | Itamoto | B62D 5/0466 | 701/41 |
| 2016/0137221 A1* | 5/2016 | Mose | B62D 5/0463 | 701/41 |
| 2016/0221572 A1* | 8/2016 | Mose | B60T 8/17551 | |
| 2016/0288824 A1* | 10/2016 | Mose | B62D 5/0463 | |
| 2018/0297631 A1* | 10/2018 | Miyatani | B62D 15/025 | |
| 2019/0227546 A1* | 7/2019 | Sato | G05D 1/0061 | |
| 2020/0010111 A1* | 1/2020 | Tsubaki | B62D 5/0463 | |
| 2020/0189650 A1* | 6/2020 | Kashiyama | B62D 5/0463 | |
| 2020/0335966 A1* | 10/2020 | Sato | H02M 1/32 | |
| 2020/0353974 A1* | 11/2020 | Nakamura | B62D 15/025 | |
| 2020/0353975 A1* | 11/2020 | Nakamura | H02P 29/028 | |
| 2020/0377150 A1* | 12/2020 | Hidaka | B62D 5/0484 | |
| 2021/0016825 A1* | 1/2021 | Miura | B62D 6/003 | |
| 2021/0206427 A1* | 7/2021 | Balogh | B62D 5/046 | |
| 2021/0276615 A1* | 9/2021 | Zheng | G05D 1/81 | |
| 2021/0347406 A1* | 11/2021 | Kim | B62D 5/0463 | |
| 2022/0135116 A1* | 5/2022 | Won | B62D 5/046 | 701/42 |

FOREIGN PATENT DOCUMENTS

| | | |
|---|---|---|
| CN | 111422250 A | 7/2020 |
| DE | 10302268 A1 | 7/2004 |
| JP | H10-076964 A | 3/1998 |
| JP | H10-167101 A | 6/1998 |
| JP | 2005-096745 A | 4/2005 |
| JP | 2014-184745 A | 10/2014 |
| JP | 2018-161917 A | 10/2018 |
| WO | WO 2017/068895 A1 | 4/2017 |

OTHER PUBLICATIONS

Oct. 4, 2022, Japanese Office Action issued for related JP Application No. 2020-217649.

* cited by examiner

MOVING BODY

CROSS-REFERENCE TO RELATED APPLICATIONS

This application is based on and claims priority under 35 USC 119 from Japanese Patent Application No. 2020-217649 filed on Dec. 25, 2020, the contents of which are incorporated herein by reference.

TECHNICAL FIELD

The present invention relates to a moving body.

BACKGROUND

JPH10-167101 discloses a steering control device which includes a manual steering mechanism which steers a front wheel by operating a steering force transmission mechanism according to a steering angle of a steering wheel, a manual detection means which detects steering by the manual steering mechanism, a resistance force applying means which applies a resistance force to the steering force transmission mechanism, an automatic steering mechanism which steers the front wheel by driving the steering force transmission mechanism with an actuator, an abnormality detection means which detects an abnormality in the automatic steering mechanism, and a control means which drives the actuator based on traveling environment information by inputting information which requires automatic steering, where the control means shuts off drive of the actuator by detecting the abnormality of the abnormality detection means and actuates the resistance force applying means and shuts off the actuated resistance force applying means by steering detection by the manual detection means.

In the device described in JPH10-167101, when the automatic steering mechanism becomes abnormal, the drive of the actuator is stopped and a resistance force is applied to the steering force transmission mechanism. However, when the steering force transmission mechanism is only given a predetermined resistance force, for example, when a moving body travels in an arcuate course and an abnormality occurs in the automatic steering mechanism, the moving body cannot move along the course.

SUMMARY

An object of the present invention is to maintain a traveling direction of a moving body even when a failure related to execution of steering control of the moving body occurs.

According to an aspect of the present invention, there is provided a moving body having a steering device and a steering control device which controls the steering device to control steering of the moving body. The steering control device selectively performs a first steering control which controls the steering of the moving body based on a movement status of the moving body and a second steering control which limits the steering of the moving body. The steering control device performs the second steering control based on a steering state of the moving body by the first steering control before occurrence of a failure when the failure related to execution of the first steering control occurs in a state where the first steering control is performed.

According to the present invention, the traveling direction of the moving body can be maintained even when a failure related to the execution of the steering control of the moving body occurs.

DESCRIPTION OF EMBODIMENTS

Figure 1:
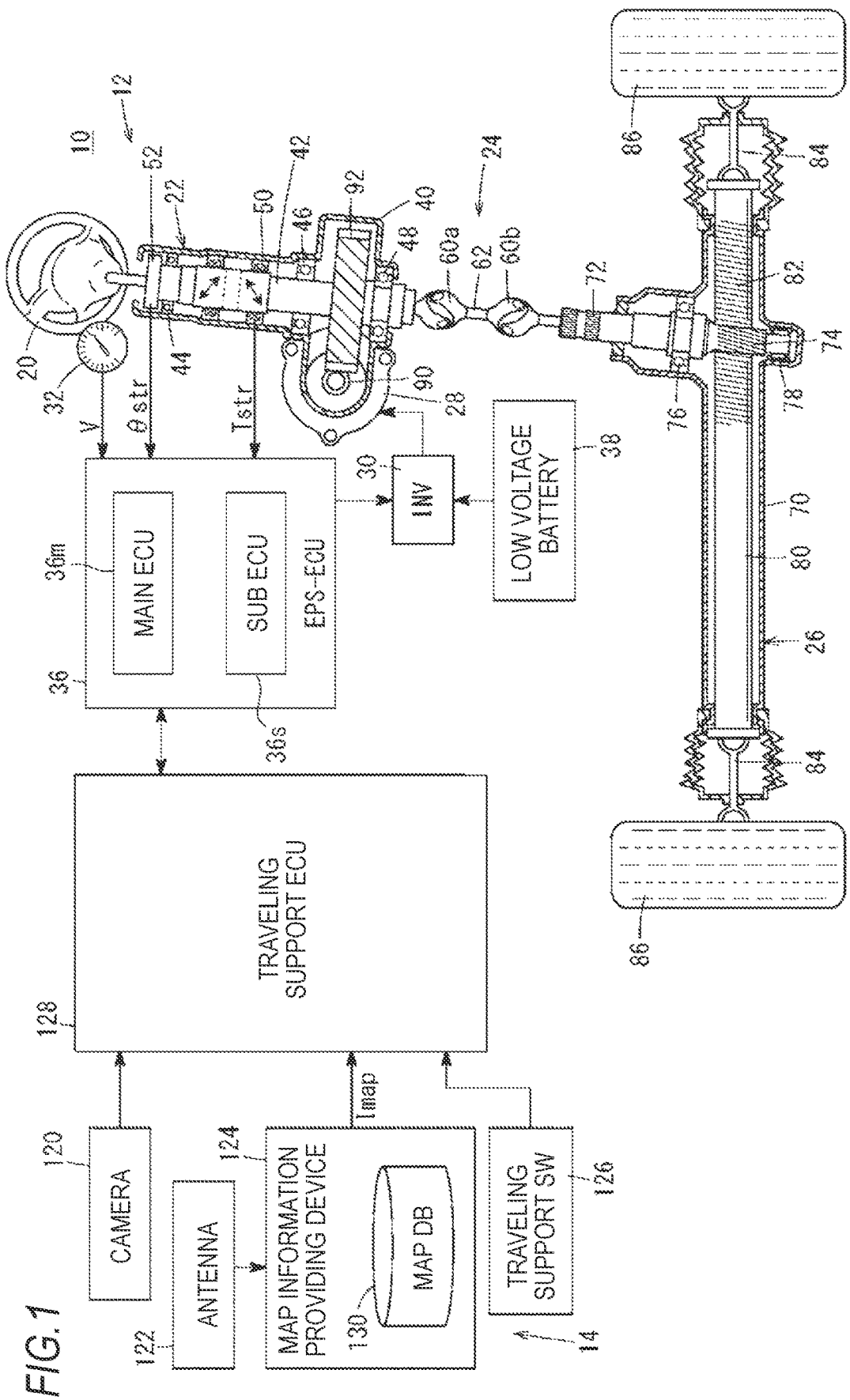
FIG. 1 is a schematic diagram illustrating a schematic configuration of an automobile 10 according to an embodiment of the present invention.

FIG. 1 is a schematic diagram illustrating a schematic configuration of an automobile 10 according to an embodiment of the present invention. As illustrated in FIG. 1, the automobile 10 includes a traveling support system 14 and an electric power steering (EPS) device 12 connected to front wheels 86. When the traveling support system 14 is operated, the automobile 10 can automatically control steering of the automobile 10 and move the automobile 10 along a lane without an occupant gripping a steering wheel 20.

The EPS device 12 includes the steering wheel 20, a steering column 22, an intermediate joint 24, a steering gearbox 26, a motor 28, an inverter 30, a vehicle speed sensor 32, an electric power steering electronic control device 36 (hereinafter referred to as "EPS-ECU 36"), and a low voltage battery 38. The steering wheel 20, the steering column 22, the intermediate joint 24, the steering gearbox 26, the inverter 30, and the motor 28 forms a steering device (steering device 100 illustrated in FIG. 2 described later) for controlling the steering of the automobile 10. The EPS-ECU 36 forms a steering control device which controls the steering device 100.

The steering column 22 includes a housing 40, a steering shaft 42 supported by bearings 44, 46, and 48 inside the housing 40, a torque sensor 50, and a rudder angle sensor 52. The "rudder angle" in the present specification indicates the steering amount of the steering wheel 20 (so-called steering wheel turning angle, steering angle). Although the rudder angle and the steering angle, which is a turning angle of the front wheel 86, do not exactly match, the rudder angle and the steering angle have a high correlation. Therefore, maintaining the "rudder angle" at an arbitrary value is synonymous with maintaining the "steering angle" at a value corresponding to the arbitrary value.

The intermediate joint 24 has two universal joints 60a and 60b and a shaft portion 62 arranged therebetween.

The steering gearbox 26 includes a housing 70, a pinion shaft 72 provided with a pinion 74 of a rack and pinion mechanism and supported by bearings 76 and 78, a rack shaft 80 provided with rack teeth 82 of the rack and pinion mechanism, and a tie rod 84.

One end of the steering shaft 42 is fixed to the steering wheel 20 and the other end is connected to the universal joint 60a. The universal joint 60a connects one end of the steering shaft 42 and one end of the shaft portion 62. The universal joint 60b connects the other end of the shaft portion 62 and one end of the pinion shaft 72. The pinion 74 of the pinion shaft 72 and the rack teeth 82 of the rack shaft 80 which can reciprocate in a vehicle width direction mesh with each other. Both ends of the rack shaft 80 are respectively connected to the left and right front wheels 86 (steering wheels) via tie rods 84.

Steering torque Tstr (rotational force) generated by a driver operating the steering wheel 20 is transmitted to the pinion shaft 72 via the steering shaft 42 and the intermediate joint 24. Then, the steering torque Tstr is converted into thrust by the pinion 74 of the pinion shaft 72 and the rack teeth 82 of the rack shaft 80 and the rack shaft 80 is displaced in the vehicle width direction. The steering angle of the front wheel 86 can be changed by the tie rod 84 steering the front wheel 86 with the displacement of the rack shaft 80. As described above, the steering device 100 of the automobile 10 is configured so that the steering of the automobile 10 can be changed according to a manual operation of the occupant.

The steering shaft 42, the intermediate joint 24, the pinion shaft 72, the rack shaft 80, and the tie rod 84 form a manual steering system which directly transmits a steering operation (manual operation) of the driver with respect to the steering wheel 20 to the front wheel 86.

The motor 28 is connected to the steering shaft 42 via a worm gear 90 and a worm wheel gear 92. An output shaft of the motor 28 is connected to the worm gear 90. The worm wheel gear 92 which meshes with the worm gear 90 is integrally or elastically formed on the steering shaft 42 itself.

The motor 28 is, for example, a three-phase AC brushless type, but may be another motor such as a three-phase AC brush type, a single-phase AC type, or a DC type. The motor 28 is supplied with power from the low voltage battery 38 via the inverter 30 controlled by the EPS-ECU 36. Then, a motor driving force Fm corresponding to the electric power is generated. The motor driving force Fm is transmitted to the rack shaft 80 via the output shaft of the motor 28, the worm gear 90, the steering shaft 42 (worm wheel gear 92), the intermediate joint 24 and the pinion shaft 72.

The torque sensor 50 detects the torque Tstr applied to the steering shaft 42 and outputs the torque Tstr to the EPS-ECU 36. The vehicle speed sensor 32 detects a vehicle speed V [km/h] of the automobile 10 and outputs the vehicle speed V [km/h] to the EPS-ECU 36. The rudder angle sensor 52 detects a rudder angle θstr [degree] indicating the steering amount of the steering wheel 20 and outputs the rudder angle θstr [degree] to the EPS-ECU 36. The torque Tstr, the vehicle speed V, and the rudder angle θstr are used in the EPS-ECU 36 for feedforward control and the like.

The inverter 30 has, for example, a three-phase bridge type configuration, performs DC/AC conversion, converts the DC from the low voltage battery 38 into a three-phase AC, and supplies the converted three-phase AC to the motor 28.

The EPS-ECU 36 controls the inverter 30 and the motor 28 of the steering device 100 to assist the steering of the driver when the traveling support system 14 is not operated. When the traveling support system 14 is operated, the inverter 30 and the motor 28 of the steering device 100 are controlled based on a traveling condition of the automobile 10, in such a manner that the EPS-ECU 36 controls the steering of the automobile 10 without being steered by the driver.

The EPS-ECU 36 includes two ECUs, of a main ECU 36m and a sub ECU 36s. The main ECU 36m and the sub ECU 36s each include at least a processor and a storage device such as a Random Access Memory (RAM) and a Read Only Memory (ROM). The processor includes a Central Processing Unit (CPU) which is a general-purpose processor that executes programs and performs various processes, a Programmable logic device (PLD) which is a processor whose circuit configuration can be changed after manufacturing such as a Field Programmable Gate Array (FPGA), a dedicated electric circuit or the like which is a processor having a circuit configuration specially designed for performing a specific process such as an Application Specific Integrated Circuit (ASIC). More specifically, the structures of these various processors are electric circuits in which circuit elements such as semiconductor elements are combined. Functions of the main ECU 36m and the sub ECU 36s will be described later.

The traveling support system 14 includes a camera 120, an antenna 122, a map information providing device 124, a traveling support switch 126, and a traveling support electronic control device 128 (hereinafter, referred to as "traveling support ECU 128").

The camera 120 is attached inside a front windshield in front of a rearview mirror of the automobile 10. The camera 120 captures a lane on a road in front of the automobile 10 as an image when the traveling support switch 126 is turned on. The camera 120 outputs image information related to the image to the traveling support ECU 128.

The antenna 122 receives signals (GNSS signals) from a plurality of satellites forming a Global Navigation Satellite System (GNSS) and outputs the received signals to the map information providing device 124.

The map information providing device 124 specifies a current position of the automobile 10 based on the output from the antenna 122 and provides map information (hereinafter, referred to as "map information Imap") regarding the current position and the surroundings of the current position to the traveling support ECU 128. The map information Imap includes information on curvature of a road on which the automobile 10 is traveling, in addition to the current position of the automobile 10. The curvature information is, for example, the curvature of the road or the radius of curvature. The map information including the curvature information is stored in a map information database 130 in advance.

The travel support ECU 128 includes at least a processor and a storage device such as a RAM and a ROM. The processor of the traveling support ECU 128 detects lanes on both sides of the automobile 10 from the image acquired by the camera 120. The processor of the traveling support ECU 128 derives a target rudder angle of the steering wheel 20 so that the automobile 10 moves, for example, in a center of a traveling path interposed between the detected lanes on both sides. The processor of the traveling support ECU 128 gives an instruction on the target rudder angle to the EPS-ECU 36 so that the rudder angle of the steering wheel 20 becomes the target rudder angle. The traveling support ECU 128 configures a control device which controls the EPS-ECU 36 as a steering control device.

Figure 2:
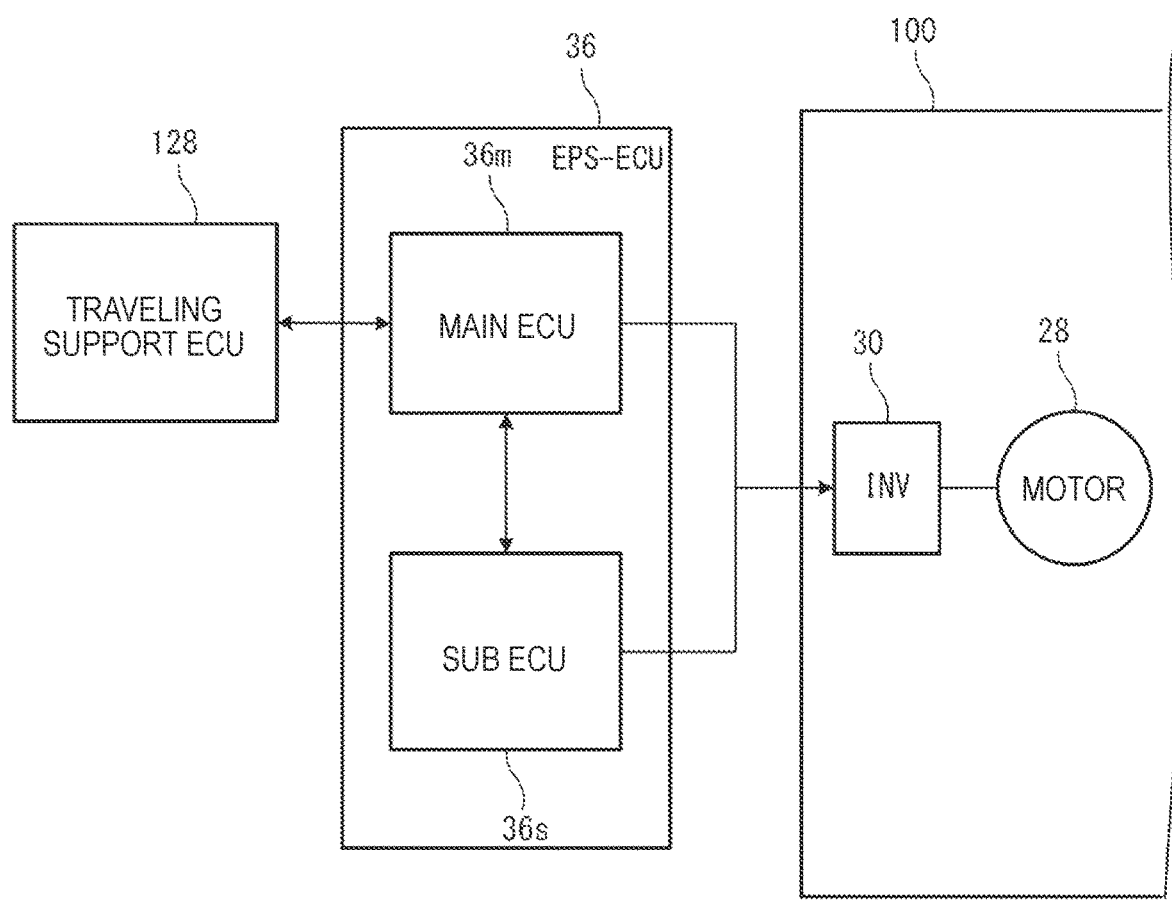
FIG. 2 is a schematic diagram illustrating a connection relationship between a traveling support ECU 128, an EPS-ECU 36, and a steering device 100.

FIG. 2 is a schematic diagram illustrating a connection relationship between the traveling support ECU 128, the EPS-ECU 36, and the steering device 100. The traveling support ECU 128 and the main ECU 36m are configured to be able to communicate with each other by a communication driver (not illustrated). The main ECU 36m and the sub ECU 36s are configured to be able to communicate with each other by a communication driver (not illustrated). The main ECU 36m and the sub ECU 36s are respectively connected to the inverter 30 by a control line.

When the traveling support system 14 is operated, the main ECU 36m controls the torque of the motor 28 so that the rudder angle becomes the target rudder angle based on the target rudder angle instructed by the traveling support ECU 128, the detection value (rudder angle θstr) of the rudder angle sensor 52, and the detection value (vehicle speed V) of the vehicle speed sensor 32. In this way, the control of the motor 28 for converging the rudder angle to the target rudder angle determined by the traveling support ECU 128 according to a traveling condition (current position, information on the road on which the vehicle is traveling, traveling speed, and the like) of the automobile 10 is described later as "rudder angle control". The rudder angle control configures a first steering control.

When a failure related to execution of the rudder angle control occurs while the rudder angle control is performed, either the main ECU 36m or the sub ECU 36s performs steering limiting control which limits the steering of the automobile 10 based on a steering state of the automobile 10 by the rudder angle control before occurrence of the failure. The steering limiting control configures a second steering control.

The steering limiting control performed by the main ECU 36m is a control which maintains the rudder angle at a value immediately before the failure occurs. Specifically, the main ECU 36m sets the detection value (rudder angle θstr) of the rudder angle sensor 52 immediately before the occurrence of a failure as a target value and controls the torque of the motor 28 so that the rudder angle converges to the target value. The main ECU 36m may perform the steering limiting control by setting the target rudder angle instructed by the traveling support ECU 128 immediately before the failure occurs to the target value and controlling the torque of the motor 28 so that the rudder angle converges to the target value. The steering limiting control performed by the main ECU 36m is hereinafter referred to as rudder angle maintenance control. While the rudder angle maintenance control is performed, the rudder angle close to the target rudder angle which is instructed immediately before the failure occurs is maintained.

The steering limiting control performed by the sub ECU 36s is a control for maintaining the torque of the motor 28 at the torque (drive current value input to the motor 28) immediately before the occurrence of a failure. The sub ECU 36s may control the motor 28 so that the torque of the motor 28 becomes a value determined based on the target rudder angle and the vehicle speed V instructed by the traveling support ECU 128 immediately before the failure occurs. When an influence of disturbance is not taken into consideration, if the target rudder angle and the vehicle speed are determined, the torque of the motor 28 required to realize the target rudder angle is also determined. Therefore, when the torque corresponding to the target rudder angle instructed immediately before the occurrence of the failure is maintained, the rudder angle close to the target rudder angle will be maintained while the steering limiting control is performed. The steering limiting control performed by the sub ECU 36s is hereinafter referred to as torque maintenance control.

The rudder angle maintenance control variably controls the torque of the motor 28 so that the rudder angle becomes constant. Therefore, a more complicated process is required as compared with a control such as torque maintenance control in which the torque of the motor 28 is made constant. Therefore, it is preferable that the main ECU 36m has a configuration having a higher arithmetic processing capacity than the sub ECU 36s.

The above-described "failure related to execution of rudder angle control" is a failure that makes it not possible to execute the rudder angle control and, for example, a failure of the traveling support ECU 128 itself, a failure related to communication between the traveling support ECU 128 and the main ECU 36m, and the like are applicable thereto. When the failure of these examples occurs, the main ECU 36m cannot acquire information on the target rudder angle. Therefore, the rudder angle control cannot be executed. In addition, a failure of a control line between the main ECU 36m and the inverter 30 also corresponds to a "failure related to execution of rudder angle control".

Figure 3:
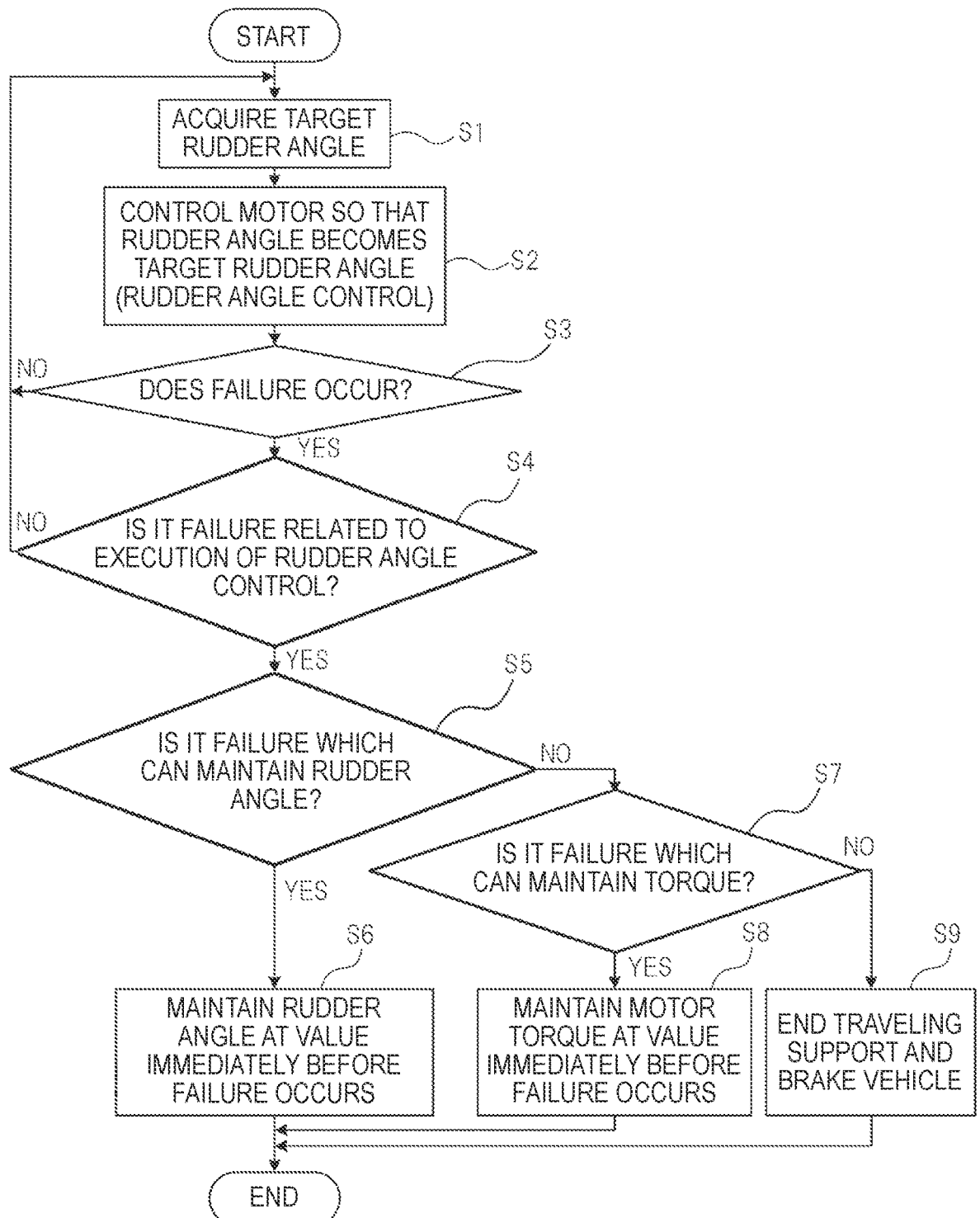
FIG. 3 is a flowchart for explaining an operation of the EPS-ECU 36 when a traveling support system 14 is operated.

FIG. 3 is a flowchart for explaining an operation of the EPS-ECU 36 when the traveling support system 14 is operated. In the following, when describing the operation performed by at least one of the main ECU 36m and the sub ECU 36s, the subject will be described as the EPS-ECU 36.

When the traveling support system 14 is operated, the main ECU 36m acquires the target rudder angle from the traveling support ECU 128 (Step S1) and controls the motor 28 so that the rudder angle becomes the target rudder angle (Step S2).

The EPS-ECU 36 sequentially monitors whether a failure (excluding the failure of the inverter 30 and the motor 28) related to the traveling support system 14 and the EPS device 12 occurs when the traveling support system 14 is operated. When it is determined that the failure related to the traveling support system 14 and the EPS device 12 does not occur (Step S3: NO), the processes of Steps S1 and S2 are repeated. When it is determined in Step S3 that a failure related to the traveling support system 14 and the EPS device 12 occurs (Step S3: YES), the EPS-ECU 36 determines whether the failure occurring is a failure related to the execution of the rudder angle control (Step S4).

When it is determined that the failure occurring is not a failure related to the execution of the rudder angle control, in other words, the failure occurring is a failure in which the rudder angle control can be continued (Step S4: NO), the process returns to Step S1 and the rudder angle control is continued. Failures in which the rudder angle control can be continued include, for example, a failure of the torque sensor 50, a failure of the sub ECU 36s, a failure of communication between the main ECU 36m and the sub ECU 36s, a failure of the control line between the sub ECU 36s and the inverter 30, and the like.

When it is determined that a failure (failure in which rudder angle control cannot be continued) related to the execution of the rudder angle control occurs (Step S4: YES), the EPS-ECU 36 determines whether the failure occurring is a failure in which the rudder angle maintenance control can be executed (Step S5). Failures in which the rudder angle control cannot be continued and the rudder angle maintenance control can be executed include, for example, a failure of the traveling support ECU 128, a failure of communication between the traveling support ECU 128 and the main ECU 36*m*, a failure of the sub ECU 36*s*, a failure of communication between the main ECU 36*m* and the sub ECU 36*s*, a failure of the control line between the sub ECU 36*s* and the inverter 30, and the like.

When it is determined that the failure occurring is a failure in which the rudder angle maintenance control can be executed (Step S5: YES), the rudder angle maintenance control is performed by the main ECU 36*m* (Step S6).

Figure 4:
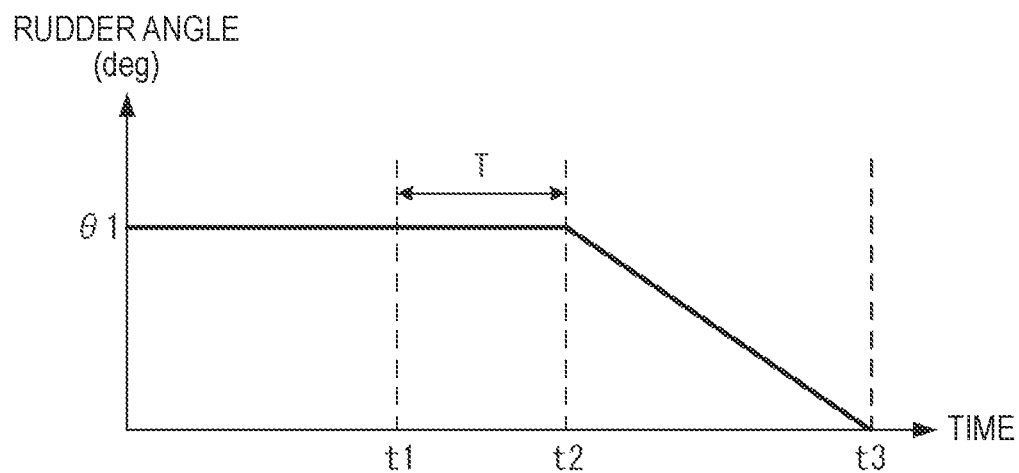
FIG. 4 is a schematic diagram illustrating a change in a rudder angle when rudder angle maintenance control is performed.
Figure 5:
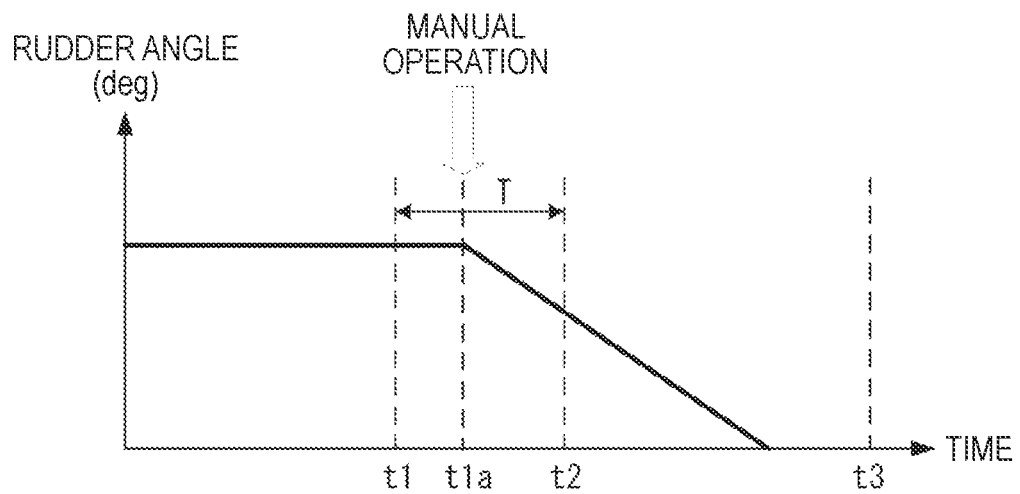
FIG. 5 is a schematic diagram illustrating a change in the rudder angle when the rudder angle maintenance control is performed.

FIG. 4 is a schematic diagram illustrating a change in the rudder angle when the rudder angle maintenance control is performed. At a time t1 illustrated in FIG. 4, when a failure in which the rudder angle control cannot be executed and the rudder angle maintenance control can be executed occurs, the rudder angle maintenance control is started and a rudder angle θ1 at the time immediately before the time t1 is maintained. When the main ECU 36*m* performs the rudder angle maintenance control in Step S6, a time period for continuing the rudder angle maintenance control is set to a time period T illustrated in FIG. 4. This time period T is, for example, a default value set based on the estimated time required from the driver's recognition of the start of the rudder angle maintenance control to the start of the operation of the steering wheel 20. As illustrated in FIG. 5, when a manual operation of the steering wheel 20 is detected even before the time period T elapses from the start of the rudder angle maintenance control, the main ECU 36*m* ends the rudder angle maintenance control with the manual operation as a trigger. In an example of FIG. 5, when detecting a manual operation at a time t1*a*, the main ECU 36*m* ends the rudder angle maintenance control. That is, the time period T is the time period for maximizing the continuation of the rudder angle maintenance control. When the time (time t2 in the example of FIG. 4 and time t1*a* in the example of FIG. 5) to end the rudder angle maintenance control comes, the main ECU 36*m* gradually reduces the torque of the motor 28 so that the rudder angle gradually decreases to zero. In the example of FIG. 4, the torque of the motor 28 and the rudder angle become zero at a time t3 slightly after the time t2.

When it is determined that the failure occurring is not a failure in which the rudder angle maintenance control can be executed (Step S5: NO), the EPS-ECU 36 determines whether the failure occurring is a failure which the torque maintenance control can be executed (Step S7). Failures in which the rudder angle control cannot be continued, the rudder angle maintenance control cannot be executed, and the torque maintenance control can be executed include, for example, a failure of the main ECU 36*m* and a failure of the control line between the main ECU 36*m* and the inverter 30.

When it is determined that the failure occurring is a failure in which the torque maintenance control can be executed (Step S7: YES), the torque maintenance control is performed by the sub ECU 36*s* (Step S8).

Figure 6:
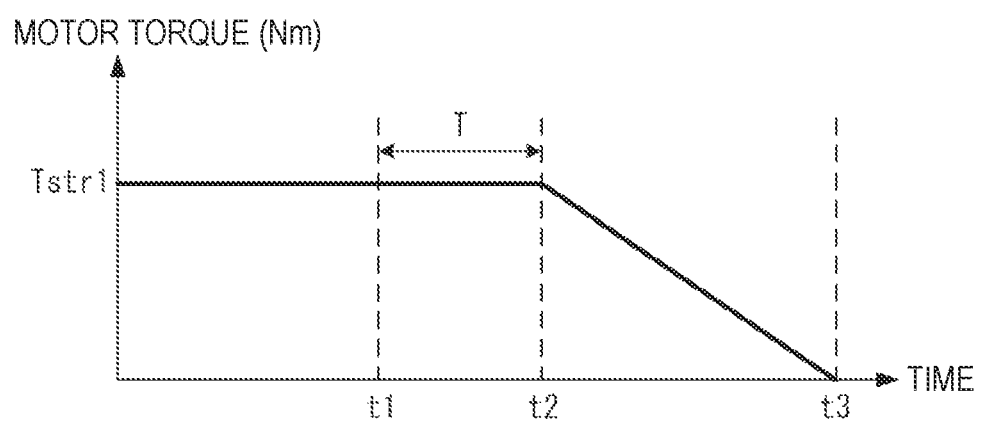
FIG. 6 is a schematic diagram illustrating a change in torque of a motor 28 when torque maintenance control is performed.

FIG. 6 is a schematic diagram illustrating a change in the torque of the motor 28 when the torque maintenance control is performed. At the time t1 illustrated in FIG. 6, when a failure in which the rudder angle control and the rudder angle maintenance control cannot be executed and the torque maintenance control can be executed occurs, the torque maintenance control is started and torque Tstr1 of the motor 28 at the time immediately before the time t1 is maintained. When the sub ECU 36*s* performs the torque maintenance control in Step S8, the time for maximally continuing the torque maintenance control is set to the above-described time period T. As similar to the rudder angle maintenance control, when the sub ECU 36*s* detects the manual operation of the steering wheel 20 even before the time period T elapses from the start of the torque maintenance control, the sub ECU 36*s* ends the torque maintenance control with the manual operation as a trigger. The sub ECU 36*s* gradually reduces the torque of the motor 28 to zero at the time (time t2 in the example of FIG. 6) of ending the torque maintenance control. In the example of FIG. 6, the torque of the motor 28 becomes zero at the time t3 slightly after the time t2.

When it is determined that the failure occurring is a failure in which the torque maintenance control cannot be executed (Step S7: NO, for example, a state where only the main ECU 36*m* is operating normally), the EPS-ECU 36 ends the operation of the traveling support system 14 and instructs an overall control unit of the automobile 10 to brake the automobile 10 (Step S9). As a result, the automobile 10 is safely stopped.

Effect of Embodiment

As described above, according to the automobile 10, when a failure occurs related to the execution of the rudder angle control while the rudder angle control is performed, the rudder angle maintenance control or the torque maintenance control is performed based on a steering state (rudder angle or torque of motor 28) before the occurrence of the failure. For example, when a failure occurs while the automobile 10 travels on an arc-shaped road (so-called curve) due to the rudder angle control, by performing the rudder angle maintenance control or the torque maintenance control, the automobile 10 can move along the curve during the above-described time period T without operating the steering wheel 20. Therefore, the automobile 10 can be safely moved until the driver starts the manual operation of the steering wheel 20.

Further, according to the automobile 10, when the time period T elapses from the start of the rudder angle maintenance control or the torque maintenance control, the steering device does not limit (maintain the rudder angle or maintain the torque of the motor 28) the steering of the automobile 10. As a result, the steering operation of the automobile 10 becomes possible by the manual operation of the driver. Therefore, even when a failure occurs, the automobile 10 can be safely advanced according to the driver's intention. Further, even before the time period T elapses, the rudder angle maintenance control or the torque maintenance control is terminated by the driver operating the steering wheel 20. Therefore, even when the driver steers immediately, the steering of the automobile 10 can be controlled by reflecting the steering, and thus the driving of the automobile 10 can be realized according to the driver's intention.

Modification Example of Rudder Angle Maintenance Control or Torque Maintenance Control Instead of using the rudder angle immediately before the occurrence of the failure as the target rudder angle used during the rudder angle maintenance control, the main ECU 36*m* may use a representative value of the rudder angle detected by the rudder angle sensor 52 during a predetermined period from the time when the failure occurs as the target rudder angle used during the rudder angle maintenance control. The representative value of the rudder angle in the predetermined period is, for example, an average value of all the rudder angles detected in the predetermined period, a median value of all the rudder angles detected in the predetermined period, and the like.

Instead of maintaining the torque of the motor 28 immediately before the occurrence of the failure, the sub ECU 36s may use a representative value of the torque of the motor 28 during a predetermined period from the time when the failure occurs as the torque used during the torque maintenance control. The representative value of the torque in the predetermined period is, for example, an average value of all the torques in the predetermined period, a median value of all the torques in the predetermined period, and the like.

In this way, the rudder angle or the torque maintained after the failure occurs can be set to the representative value of the rudder angle or the representative value of the torque in the predetermined period immediately before the occurrence of the failure, in such a manner that, even when there is a momentary change in the rudder angle immediately before the failure occurs, the effect of the change can be eliminated. As a result, it is possible to prevent a large change in the rudder angle or the torque before and after the occurrence of the failure with high accuracy, and thus the automobile 10 can be safely moved along the road.

First Modification Example of Automobile

In the embodiment described above, the time period T for maximally continuing the rudder angle maintenance control or the torque maintenance control is described as a fixed value. However, the time period T may be a variable value determined according to a movement status of the automobile 10. In particular, the traveling support ECU 128 may derive the time period T based on the position of the automobile 10, the vehicle speed V of the automobile 10, the road information (curvature information) of the road on which the automobile 10 travels, and the curvature information of the traveling road obtained from the captured image of the camera 120, and then the traveling support ECU 128 may sequentially perform the process of transmitting the derived time period T to the EPS-ECU 36. As for the curvature information, only one of the information included in the map information and the information obtained from the captured image of the camera 120 may be used for deriving the time period T.

Figure 7:
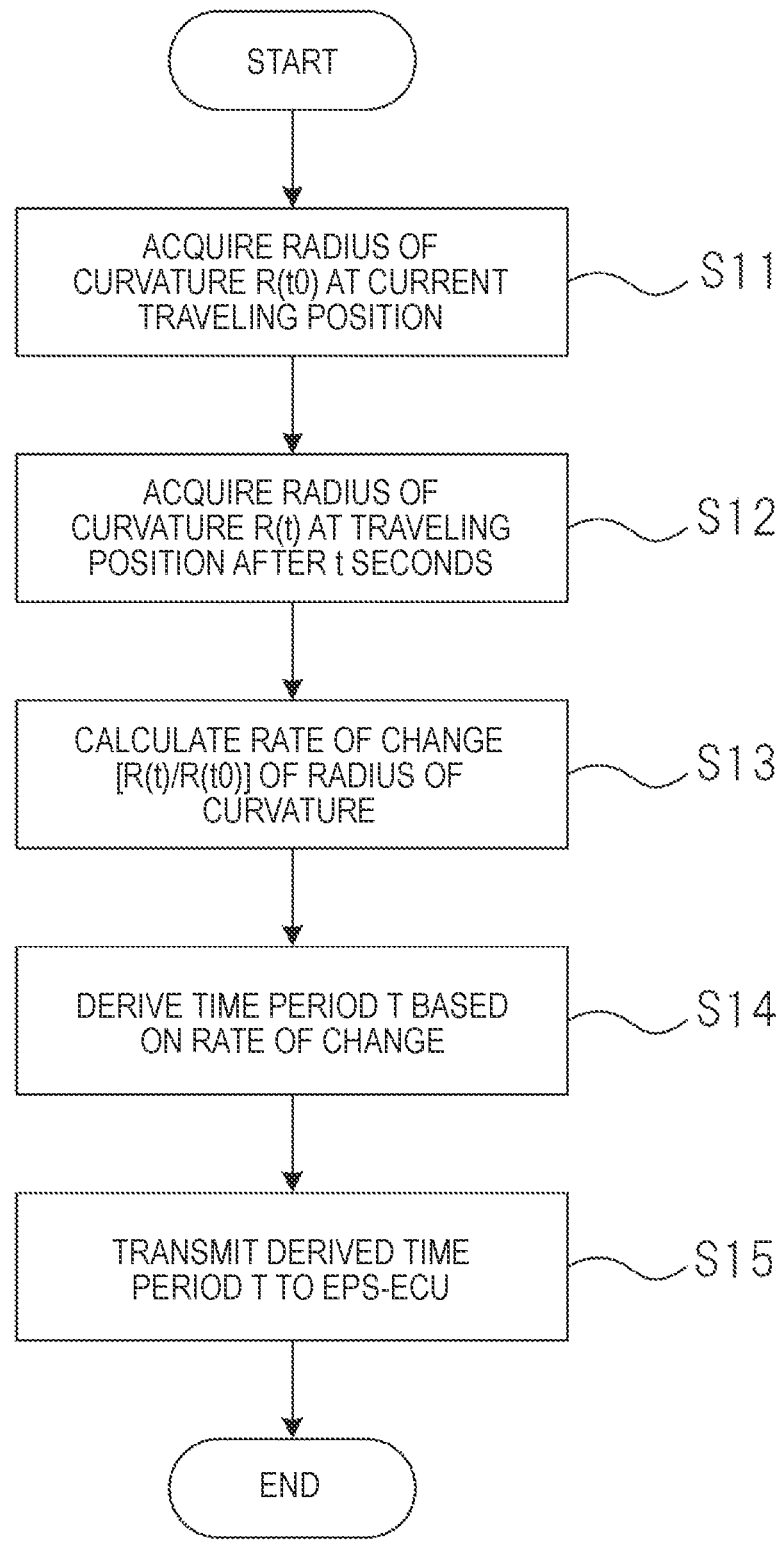
FIG. 7 is a flowchart for explaining an example of derivation processing of a time period T by the traveling support ECU 128.

FIG. 7 is a flowchart for explaining an example of a derivation processing of the time period T by the traveling support ECU 128. The process illustrated in FIG. 7 is repeatedly performed while Steps S1 and S2 of FIG. 3 are performed (that is, a period during which the rudder angle control is performed). Further, the process illustrated in FIG. 7 is repeatedly performed in a state where the traveling support switch 126 is turned on and any of the rudder angle control, the rudder angle maintenance control, and the torque maintenance control can be performed. In other words, the process illustrated in FIG. 7 is not performed in a state (specifically, in a state where the steering of the automobile 10 is controlled by the manual operation of the steering wheel 20) where the steering of the automobile 10 is controlled by other than the rudder angle control, the rudder angle maintenance control, and the torque maintenance control.

First, the traveling support ECU 128 acquires a radius of curvature R(t0) of the road at the current traveling position of the automobile 10 based on the map information Imap acquired from the map information providing device 123 and the captured image of the camera 120 (Step S11).

Next, based on the vehicle speed V of the automobile 10 acquired from the vehicle speed sensor 32 and the like and the map information Imap acquired from the map information providing device 123 and the captured image of the camera 120, the traveling support ECU 128 acquires a radius of curvature R(t) of the road at the traveling position of the automobile after t seconds (t is, for example, the same value as the maximum value that can be set for the time period T) from the present time (Step S12).

Next, the traveling support ECU 128 calculates the rate of change of the radius of curvature of the road on which the automobile 10 travels (Step S13). The rate of change can be obtained, for example, by dividing the radius of curvature R(t) by the radius of curvature R(t0). When the automobile 10 drives on a curve, if the traveling position after t seconds is near the entrance of the curve, the above rate of change will be a small value, and if the traveling position after t seconds is near the exit of the curve, the above rate of change will be a large value. Further, when the automobile 10 travels on a straight road (straight road), the above rate of change is close to 1.

Next, the traveling support ECU 128 derives the time period T based on the calculated rate of change (Step S14). The ROM of the traveling support ECU 128 stores in advance a data table in which the rate of change of the radius of curvature and the time period T are associated with each other. The traveling support ECU 128 reads and acquires the time period T corresponding to the calculated rate of change from the data table.

The data table is, for example, a table in which when the rate of change is equal to or greater than a first threshold value (for example, 10), the time period T becomes the minimum (for example, one second), when the rate of change is equal to or less than a second threshold value (for example, 1), which is smaller than the first threshold value, the time period T becomes the maximum (for example, two seconds), and when the rate of change is greater than the second threshold value and less than the first threshold value, the larger the rate of change, the smaller the time period T. That is, when the traveling position of the automobile 10 is close to the exit of the curve, the rate of change is equal to or greater than the first threshold value, so that the time period T becomes a relatively small value. When the automobile 10 travels straight or is far from the exit of the curve, the rate of change is equal to or less than the second threshold value, so that the time period T becomes a relatively large value.

After Step S14, the traveling support ECU 128 transmits the derived time period T to the EPS-ECU 36. In the EPS-ECU 36, the time period T is stored in the ROM of the main ECU 36m and the ROM of the sub ECU 36s respectively. The latest time period T derived by the traveling support ECU 128 is sequentially overwritten and updated in each of the ROM of the main ECU 36m and the ROM of the sub ECU 36s.

When performing the rudder angle maintenance control in Step S6 of FIG. 3, the main ECU 36m of the EPS-ECU 36 sets the maximum value of the continuation time of the rudder angle maintenance control to the latest time period T (value derived by the traveling support ECU 128) stored in the built-in ROM.

Similarly, when performing the torque maintenance control in Step S8 of FIG. 3, the sub ECU 36s of the EPS-ECU 36 sets the maximum value of the continuation time of the torque maintenance control to the latest time period T (value derived by the traveling support ECU 128) stored in the built-in ROM.

As described above, according to the present modification example, the maximum continuation time of the rudder angle maintenance control and the maximum continuation time of the torque maintenance control are determined according to the traveling condition of the automobile 10. Therefore, as compared with the case where the time period T is fixed, the rudder angle maintenance control or the torque maintenance control can be terminated at a more appropriate time even when the steering device is not manually operated. For example, it is assumed that a failure occurs while the automobile 10 travels near the exit of a curve and the rudder angle maintenance control or the torque maintenance control is started. In this case, the shorter a distance to the exit of the curve, that is, the larger the rate of change described above, the earlier the rudder angle maintenance control or the torque maintenance control is terminated. Therefore, it is possible to prevent the rudder angle maintenance control or the torque maintenance control from being continued in a state where the automobile 10 travels on a straight road passing through the exit of the curve, and thus the automobile 10 can be safely moved.

In addition, in the present modification example, even when a failure related to the execution of the rudder angle control does not occur, the traveling support ECU 128 periodically derives an appropriate time period T according to the traveling condition at that time and the derived time period T is transmitted to the EPS-ECU 36. Therefore, for example, even when the failure related to the execution of the rudder angle control is a failure related to the communication between the traveling support ECU 128 and the EPS-ECU 36, for example, the EPS-ECU 36 can determine the maximum continuation time of the rudder angle maintenance control or the torque maintenance control based on the time period T derived at the time before the occurrence of the failure. Therefore, when a failure occurs, the steering restriction of the automobile 10 can be executed for an appropriate time period according to the driving condition.

In the explanation of FIG. 7, the traveling support ECU 128 derives the time period T based on the rate of change of the radius of curvature of the road on which the automobile 10 travels. However, the present invention is not limited to this and the traveling support ECU 128 may derive the time period T based on the rate of change of the curvature (the reciprocal of the radius of curvature) of the road on which the automobile 10 travels.

Second Modification Example of Automobile

Figure 8:
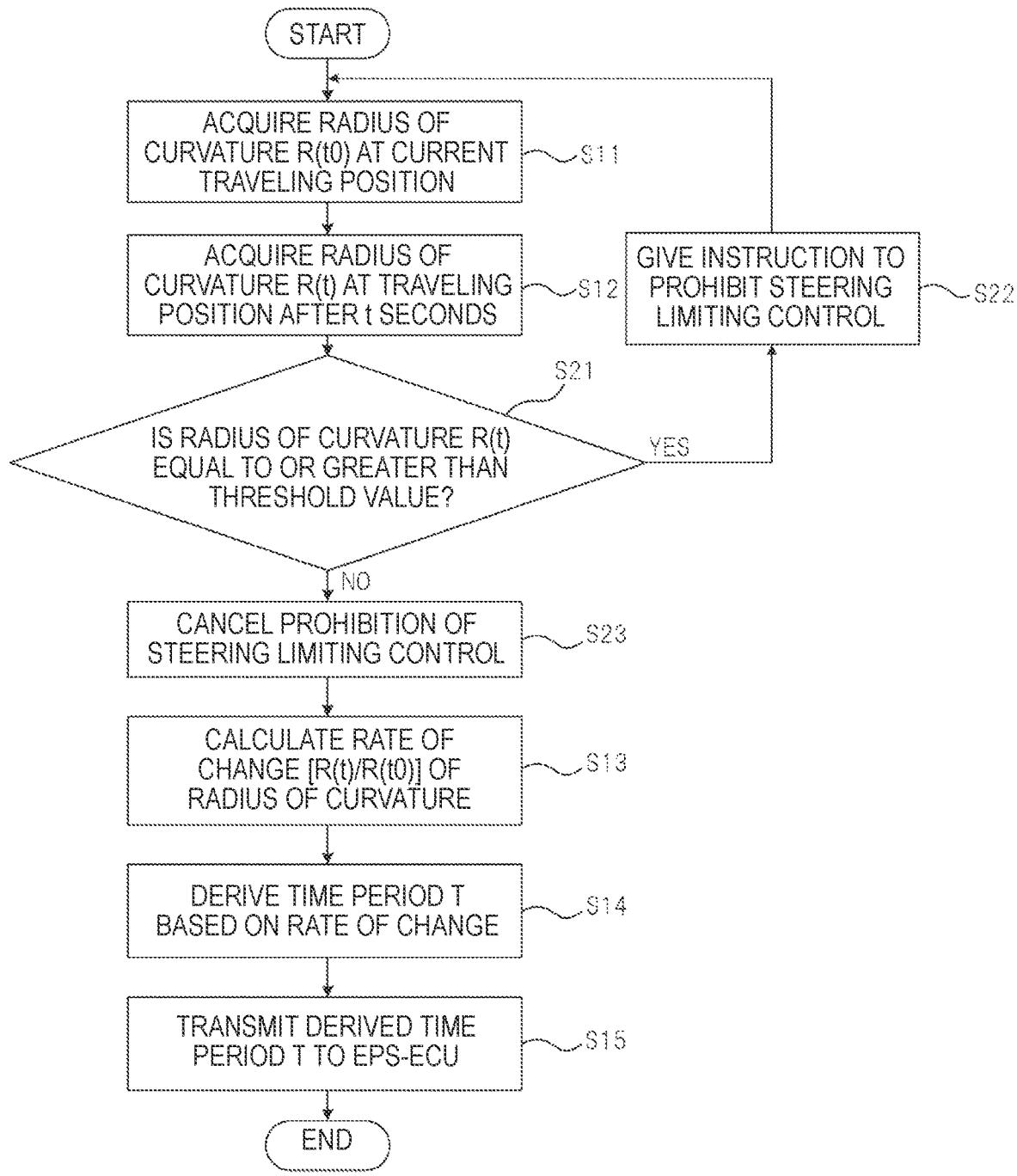
FIG. 8 is a flowchart for explaining a modification example of an operation of the traveling support ECU 128 when steering angle control is performed.

FIG. 8 is a flowchart for explaining a modification example of the operation of the traveling support ECU 128 when the rudder angle control is performed. In FIG. 8, the same processing as in FIG. 7 is designated by the same reference numerals and letters and the description thereof will be omitted. The flowchart illustrated in FIG. 8 is the same as that of FIG. 7 except that Step S21, Step S22, and Step S23 are added.

After Step S12, the traveling support ECU 128 determines whether the radius of curvature R(t) acquired in Step S12 is equal to or greater than a threshold value (Step S21). The Step S21 is equivalent to the process of determining whether the automobile 10 reaches the straight road after t seconds. When the determination in Step S21 is YES (when it is determined that the automobile 10 reaches the straight road after t seconds), the traveling support ECU 128 gives an instruction to the EPS-ECU 36 to prohibit execution of the steering limiting control (rudder angle maintenance control or torque maintenance control) (Step S22) and returns the process to Step S11. When the determination in Step S21 is NO, the traveling support ECU 128 cancels the instruction to the EPS-ECU 36 to prohibit the steering limiting control (Step S23) and performs the processes after Step S13.

Figure 9:
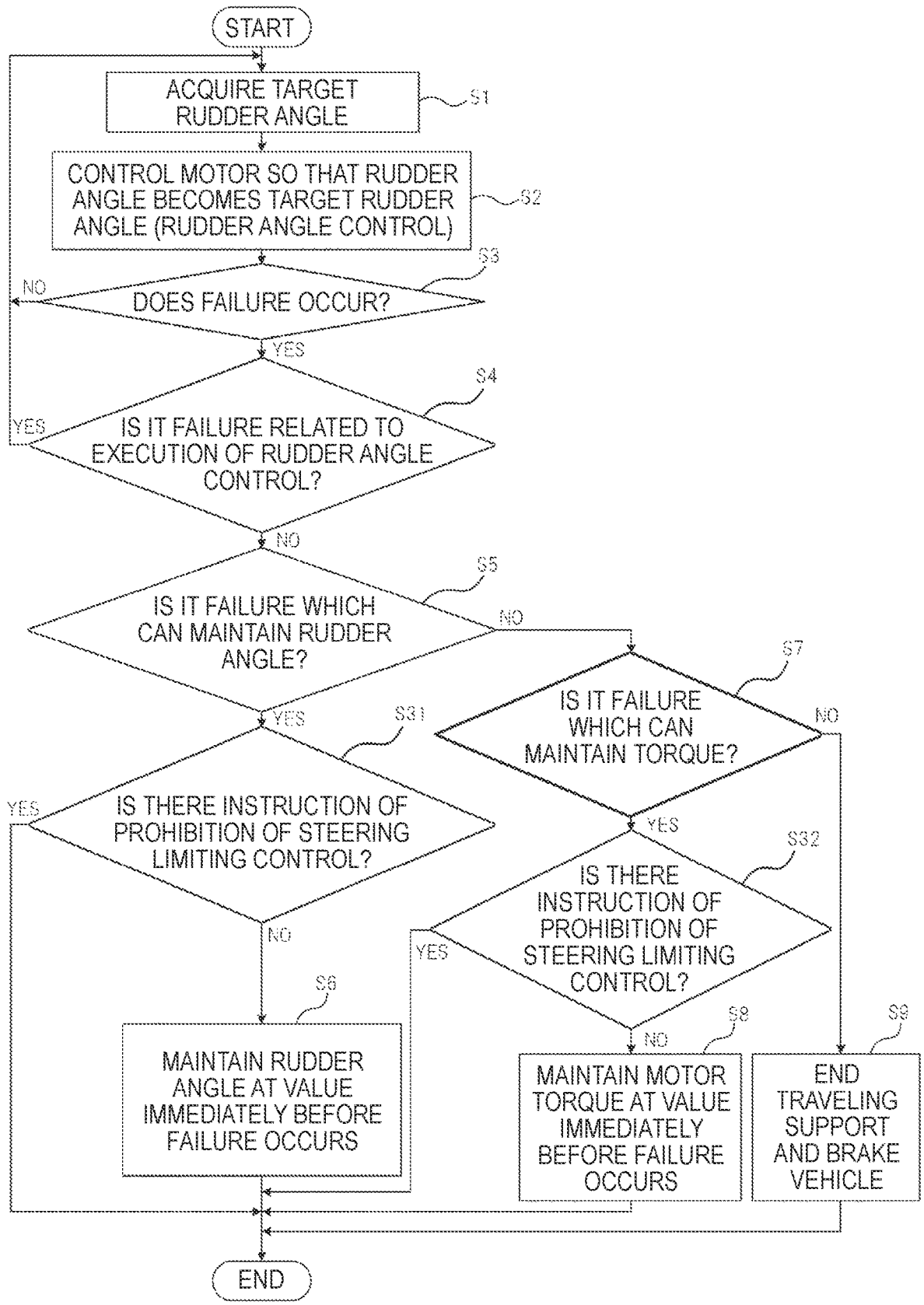
FIG. 9 is a flowchart for explaining a modification example of an operation of the EPS-ECU 36 when the traveling support system 14 is operated.

FIG. 9 is a flowchart for explaining a modification example of the operation of the EPS-ECU 36 when the traveling support system 14 is operated. In FIG. 9, the same processing as in FIG. 3 is designated by the same reference numerals and letters and the description thereof will be omitted. The flowchart illustrated in FIG. 9 is the same as that of FIG. 3 except that Steps S31 and S32 are added.

When the determination in Step S5 is YES, the main ECU 36m determines whether the prohibition of the steering limiting control is instructed by the traveling support ECU 128 (Step S31). When the prohibition of the steering limiting control is not instructed (Step S31: NO), the main ECU 36m performs the rudder angle maintenance control in Step S6, whereas when the prohibition of the steering limiting control is instructed (Step S31: YES), the rudder angle maintenance control is not performed.

When the determination in Step S7 is YES, the sub ECU 36s determines whether the prohibition of the steering limiting control is instructed by the traveling support ECU 128 (Step S32). When the prohibition of the steering limiting control is not instructed (Step S32: NO), the sub ECU 36s performs the torque maintenance control in Step S8, whereas when the prohibition of the steering limiting control is instructed (Step S32: YES), the torque maintenance control is not performed.

According to the present modification example, when it is determined that the automobile 10 moves on a straight road after the lapse of time t, the derivation of the time period T by the traveling support ECU 128 is stopped. Therefore, the processing load of the traveling support ECU 128 can be reduced. Also, in such a situation, the rudder angle maintenance control and the torque maintenance control will not be executed even when a failure related to the execution of the rudder angle control occurs. In this situation, since the automobile 10 goes straight, it is possible to maintain the automobile 10 going straight without performing the rudder angle maintenance control and the torque maintenance control when a failure occurs. In this situation, by preventing the rudder angle maintenance control and the torque maintenance control from being performed, it becomes possible for the driver to steer the automobile 10 at his or her intention when a failure occurs. As a result, it is possible to continue driving as the driver wants.

In FIG. 8, the curvature may be used instead of the radius of curvature. In this case, Step S21 is a process of determining whether the curvature of the traveling position after t seconds is equal to or less than the threshold value. Therefore, when the curvature is equal to or less than the threshold value, the process of Step S22 is performed, and when the curvature exceeds the threshold value, the process of Step S23 is performed.

Third Modification Example of Automobile

In FIG. 8, the process of Step S22 and Step S23 may be omitted, and when the determination of Step S21 is YES, the process of Step S11 may be performed, and when the determination of Step S21 is NO, the process of Step S13 may be performed. That is, when the automobile 10 is traveling on a straight road, the derivation of the time period T may be stopped, and even when the automobile 10 is traveling on a straight road, the rudder angle maintenance control or the torque maintenance control may not be prohibited. The operation of the EPS-ECU 36 in this case is the same as that illustrated in FIG. 3. However, the time period T is set to a value derived by the traveling support ECU 128.

In the present modification example, when a failure occurs in which the rudder angle control cannot be executed while the automobile 10 travels on a straight road, the time period T is set to the time period T derived by the traveling support ECU 128 when the automobile 10 is closest to the exit of the curve. Since the time period T is derived when the above-described rate of change is sufficiently large, the time period T becomes the minimum value according to the above-described data table. Therefore, even when the rudder angle maintenance control or the torque maintenance control is performed while the automobile 10 travels straight, the continuation time can be minimized. Therefore, it becomes possible to immediately perform the steering operation of the automobile 10 at the driver's intention, and thus it is possible to continue moving as the driver wants.

Fourth Modification Example of Automobile

The EPS-ECU 36 may have a configuration in which the sub ECU 36s is deleted. In this case, the target rudder angle cannot be acquired from the traveling support ECU 128 in a state where the main ECU 36m performs the rudder angle control, and when the rudder angle control cannot be continued, the main ECU 36m performs the rudder angle maintenance control. Even with this configuration, it is possible to move the automobile 10 along the road for a certain period of time without operating the steering wheel 20 after the failure occurs.

Fifth Modification Example of Automobile

The main ECU 36m may be deleted from the EPS-ECU 36 and the traveling support ECU 128 and the sub ECU 36s may be communicably connected to each other. In this case, the sub ECU 36s performs torque control for controlling the torque of the motor 28 instead of the rudder angle control. The torque control is a control which obtains a torque instruction value (drive current value) necessary for realizing the target rudder angle based on the target rudder angle instructed by traveling support ECU 128 and the vehicle speed V of the automobile 10 and supplies the drive current value to the motor 28. The torque control configures the first steering control. When the target rudder angle cannot be acquired from the traveling support ECU 128 and the torque control cannot be continued, the sub ECU 36s performs the torque maintenance control described above. Even with this configuration, it is possible to move the automobile 10 along the road for a certain period of time without operating the steering wheel 20 after the failure occurs.

In the explanation so far, the automobile is exemplified as a moving body. However, the embodiment of the moving body of the present invention is not limited to the automobile and may be a ship or an aircraft having no driving wheels. In the case of an aircraft, a device for operating the moving blades forms a steering device. In the case of ships, a device for operating a rudder forms the steering device.

As described above, the present specification includes at least the following items. The components and the like corresponding to those of the embodiments described above are shown in parentheses, but the present invention is not limited thereto.

(1) A moving body having a steering device (steering wheel 20, steering column 22, intermediate joint 24, steering gearbox 26, inverter 30, and motor 28) and a steering control device (EPS-ECU 36) which controls the steering device to control steering of the moving body (automobile 10), where
the steering control device is configured to,
selectively perform a first steering control (rudder angle control) which controls the steering of the moving body based on a movement status of the moving body and a second steering control (rudder angle maintenance control, torque maintenance control) which limits the steering of the moving body, and
perform the second steering control based on a steering state (rudder angle, motor torque) of the moving body by the first steering control before occurrence of a failure when the failure related to execution of the first steering control occurs in a state where the first steering control is performed.

According to (1), when the failure related to the execution of the first steering control occurs in a state where the first steering control is performed, the second steering control is performed based on the steering state before the occurrence of the failure. Therefore, for example, it is possible to maintain the steering state before the occurrence of the failure, and thus it is possible to maintain a traveling direction of the moving body even when a failure occurs in which the first steering control cannot be continued.

(2) The moving body according to (1), where
the steering control device is configured to perform the second steering control only when the failure occurs.

According to (2), since the second steering control is not performed when the failure does not occur, the steering of the moving body can be freely controlled.

(3) The moving body according to (1) or (2), where
the steering control device is configured to end the second steering control after a predetermined time period (time period T) elapses from the start of the second steering control.

According to (3), when the predetermined time period elapses from the start of the second steering control, restriction on the steering of the moving body by the steering device is not performed. As a result, a steering operation of the moving body can be performed by a manual operation of the steering device by an occupant, and thus the moving body can be safely advanced even when a failure occurs.

(4) The moving body according to (3), where
the steering device can change the steering of the moving body according to a manual operation, and
even when the manual operation is not performed after starting the second steering control, the steering control device is configured to end the second steering control after a lapse of the predetermined time period.

According to (4), even when the manual operation by the occupant is not performed, the restriction on the steering of the moving body is terminated in the predetermined time period. Therefore, it is possible to prevent the steering from being restricted more than necessary and to allow the moving body to be safely advanced even when a failure occurs.

(5) The moving body according to (3) or (4), where
the predetermined time period is determined based on curvature information of a moving path of the moving body.

According to (5), the restriction on the steering can be released at the time when the moving body reaches a predetermined position (for example, a position where the curve of the road ends), and thus the movement after the restriction is released can be safely performed.

(6) The moving body according to any one of (3) to (5), where
the predetermined time period is determined based on a moving speed of the moving body.

According to (6), the restriction on the steering can be released at the time when the moving body reaches a predetermined position (for example, the position where the curve of the road ends), and thus the movement after the restriction is released can be safely performed.

(7) The moving body according to any one of (1) to (6), where
the steering device can change the steering of the moving body according to a manual operation, and the steering control device is configured to end the second steering control when the manual operation is performed in a state where the second steering control is performed.

According to (7), when the manual operation by the occupant is performed, the restriction on the steering of the moving body is terminated. Therefore, it is possible to steer the moving body according to the intention of the occupant.

(8) The moving boy according to any one of (1) to (7), where the steering device can change the steering of the moving body according to a manual operation, the second steering control includes a steering angle maintenance control (rudder angle maintenance control) for maintaining a steering angle of a wheel (front wheel 86) of the moving body to a value based on a steering state of the moving body by the first steering control and a torque maintenance control for maintaining torque of an actuator (motor 28) included in the steering device to a value based on the steering state of the moving body by the first steering control, and the steering control device is configured to perform the torque maintenance control when the failure occurs and the steering angle maintenance control is not possible.

According to (8), when the steering angle cannot be maintained, the torque of the actuator is maintained. By executing the steering restriction in two stages in this way, redundancy can be improved and safety when a failure occurs can be enhanced.

What is claimed is:

1. A moving body having a steering device and a steering control device which controls the steering device to control steering of the moving body, wherein the moving body includes a traveling support system configured to perform traveling support including automatic steering, the steering control device is configured to selectively perform a first steering control which controls the steering of the moving body based on a movement status of the moving body and a second steering control which limits the steering of the moving body, and perform the second steering control based on a steering state of the moving body by the first steering control before occurrence of a failure when the failure related to execution of the first steering control occurs in a state where the first steering control is performed, the second steering control includes a steering angle maintenance control for maintaining a steering angle of a wheel of the moving body to a value based on a steering state of the moving body by the first steering control, and the steering control device is further configured to perform a torque maintenance control for maintaining torque of an actuator included in the steering device to a value based on the steering state of the moving body by the first steering control based on the failure occurring and the steering angle maintenance control not being possible.

2. The moving body according to claim 1, wherein the steering control device is further configured to end the second steering control after a predetermined time period elapses from a start of the second steering control.

3. The moving body according to claim 2, wherein the steering device is configured to change the steering of the moving body according to a manual operation, and the steering control device is further configured to end the second steering control after a lapse of the predetermined time period even when the manual operation is not performed after starting the second steering control.

4. The moving body according to claim 2, wherein the predetermined time period is determined based on curvature information of a moving path of the moving body.

5. The moving body according to claim 2, wherein the predetermined time period is determined based on a moving speed of the moving body.

6. The moving body according to claim 1, wherein the steering control device is further configured to perform the second steering control only when the failure occurs.

7. The moving body according to claim 1, wherein the steering device is configured to change the steering of the moving body according to a manual operation, and the steering control device is further configured to end the second steering control with the manual operation as a trigger, when the manual operation is performed.

8. The moving boy according to claim 1, wherein the steering device is configured to change the steering of the moving body according to a manual operation.

* * * * *